(12) United States Patent
Son et al.

(10) Patent No.: US 12,521,586 B2
(45) Date of Patent: Jan. 13, 2026

(54) WIND PRESSURE TYPE OF HAPTIC FIREFIGHTING NOZZLE INTERFACE FOR VIRTUAL FIRE-FIGHTING TRAINING AND OPERATING METHOD THEREOF

(71) Applicant: ELECTRONICS AND TELECOMMUNICATIONS RESEARCH INSTITUTE, Daejeon (KR)

(72) Inventors: Hyungki Son, Daejeon (KR); Ung-Yeon Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 638 days.

(21) Appl. No.: 17/983,571

(22) Filed: Nov. 9, 2022

(65) Prior Publication Data

US 2023/0166147 A1 Jun. 1, 2023

(30) Foreign Application Priority Data

Dec. 1, 2021 (KR) .................. 10-2021-0169900
Sep. 14, 2022 (KR) .................. 10-2022-0115652

(51) Int. Cl.
*A62C 99/00* (2010.01)
*G06F 3/01* (2006.01)
*G09B 5/06* (2006.01)

(52) U.S. Cl.
CPC .......... *A62C 99/0081* (2013.01); *G06F 3/011* (2013.01); *G06F 3/016* (2013.01); *G09B 5/06* (2013.01)

(58) Field of Classification Search
None
See application file for complete search history.

(56) References Cited

U.S. PATENT DOCUMENTS 10,706,693 B1 * 7/2020 Castillo Canales ...... G08B 6/00
10,871,627 B1 * 12/2020 Fang .................. G02B 27/0093
(Continued)

FOREIGN PATENT DOCUMENTS

KR 10-2015-0108553 A 9/2015
KR 10-1910529 B1 10/2018
(Continued)

OTHER PUBLICATIONS

Machine translation of KR 20170090276 obtained from Espaconet. (Year: 2025).*

(Continued)

*Primary Examiner* — Paul A D'Agostino
(74) *Attorney, Agent, or Firm* — LRK PATENT LAW FIRM

(57) ABSTRACT

A wind pressure type of haptic firefighting nozzle interface that is interworked with virtual reality (VR) content for virtual firefighting training is provided. The wind pressure type of haptic firefighting nozzle interface includes: a flow controller for adjusting a spraying intensity of water sprayed on the VR content; a stream shaper for adjusting a spray shape according to a radiation angle of the water sprayed on the VR content; and at least one first haptic device for providing haptic feedback corresponding to the spraying intensity and the spraying shape determined according to control through the flow controller and the stream shaper using wind pressure.

18 Claims, 16 Drawing Sheets

(56) References Cited

U.S. PATENT DOCUMENTS

| | | | |
|---|---|---|---|
| 10,960,303 B2* | 3/2021 | Bianchi | G06F 3/016 |
| 12,455,619 B2* | 10/2025 | Browy | G06V 20/20 |
| 2002/0075225 A1* | 6/2002 | Schena | G05G 9/047 |
| | | | 345/156 |
| 2004/0147318 A1* | 7/2004 | Shahoian | G06F 3/016 |
| | | | 463/36 |
| 2004/0183777 A1* | 9/2004 | Bevirt | G06F 3/05 |
| | | | 345/156 |
| 2006/0281550 A1* | 12/2006 | Schena | G06F 3/016 |
| | | | 463/37 |
| 2008/0300055 A1* | 12/2008 | Lutnick | G07F 17/3209 |
| | | | 463/39 |
| 2012/0122062 A1 | 5/2012 | Yang et al. | |
| 2013/0278631 A1* | 10/2013 | Border | G06F 3/04842 |
| | | | 345/633 |
| 2016/0030835 A1* | 2/2016 | Argiro | A63F 13/23 |
| | | | 463/31 |
| 2017/0178406 A1* | 6/2017 | Anderson | G06T 19/006 |
| 2019/0043260 A1* | 2/2019 | Anderson | G06F 3/017 |
| 2019/0321724 A1* | 10/2019 | Bianchi | A63F 13/212 |
| 2020/0030651 A1 | 1/2020 | Choi | |
| 2020/0082636 A1* | 3/2020 | Rudell | A63F 13/212 |
| 2020/0210127 A1* | 7/2020 | Browy | G06F 3/14 |
| 2021/0046345 A1* | 2/2021 | Laskaris | A62C 31/28 |
| 2021/0370117 A1 | 12/2021 | Park et al. | |
| 2023/0166147 A1* | 6/2023 | Son | G09B 9/00 |
| | | | 434/226 |

FOREIGN PATENT DOCUMENTS

| | | |
|---|---|---|
| KR | 10-2019-0122546 A | 10/2019 |
| KR | 10-2061582 B1 | 1/2020 |
| KR | 10-2020-0049261 A | 5/2020 |
| KR | 10-2021-0111542 A | 9/2021 |

OTHER PUBLICATIONS

Su-Ran Park et al., "A Study on the Development of Realistic VR firefighting Training Content enhanced reproduction of actual fire site", Korea Contents Association 2021 Domestic General Conference, Special Session: Electronics and Telecommunications Research Institute (ETRI).

Seungwoo JE et al., "AirBeam: Haptic feedback delivered using compressed air on the finger", Proceedings of HCIK 2019.

\* cited by examiner

WIND PRESSURE TYPE OF HAPTIC FIREFIGHTING NOZZLE INTERFACE FOR VIRTUAL FIRE-FIGHTING TRAINING AND OPERATING METHOD THEREOF

CROSS-REFERENCE TO RELATED APPLICATIONS

This application claims priority to and the benefit of Korean Patent Application Nos. 10-2021-0169900 and 10-2022-0115652, filed in the Korean Intellectual Property Office on Dec. 1, 2021 and Sep. 14, 2022, respectively, the entire contents of which are incorporated herein by reference.

BACKGROUND OF THE INVENTION

1. Field of the Invention

The present disclosure relates to a wind pressure type of haptic firefighting nozzle interface for virtual firefighting training and an operation method thereof. More particularly, the present disclosure relates to a wind pressure type of haptic firefighting nozzle interface for virtual firefighting training and an operation method thereof capable of providing waterproof pressure generated from the firefighting nozzle to a user realistically during firefighting training of the user in a virtual environment.

2. Description of Related Art

In recent years, the use of virtual reality (VR) technology for virtual training in a specific occupation group is increasing. However, most of the VR training uses a basic controller to control the contents, and some VR training uses the equipment of a specific occupation group modified as a controller. Nevertheless, there are still few devices that provide haptic feedback, and even when providing haptic feedback, vibration feedback is mainly provided.

In the case of firefighting training among specific occupation groups, water pressure occurs when waterproofing using a firefighting nozzle. Therefore, there is a water injection method of holding the firefighting nozzle and watering, and the posture to use the firefighting nozzle is also important. However, it is difficult to provide such waterproof pressure in a VR environment, and therefore training efficiency is reduced.

SUMMARY OF THE INVENTION

The present invention has been made in an effort to provide a wind pressure type of haptic firefighting nozzle interface for virtual firefighting training and an operation method thereof capable of equally providing waterproof pressure generated from the firefighting nozzle to a user during user firefighting training of the user in a virtual environment.

In addition, the present disclosure has been made in an effort to provide a wind pressure type of haptic firefighting nozzle interface for virtual firefighting training and an operation method thereof capable of expressing waterproof pressure generated from the firefighting nozzle.

According to an embodiment, a wind pressure type of haptic firefighting nozzle interface that is interworked with virtual reality (VR) content for virtual firefighting training is provided. The wind pressure type of haptic firefighting nozzle interface includes: a flow controller for adjusting a spraying intensity of water sprayed on the VR content; a stream shaper for adjusting a spray shape according to a radiation angle of the water sprayed on the VR content; and at least one first haptic device for providing haptic feedback corresponding to the spraying intensity and the spraying shape determined according to control through the flow controller and the stream shaper using wind pressure.

Each of the at least one first haptic device may include: a main motor that generates rotational force according to rotation; a transmission that rotates the main motor by receiving a motor rotation signal according to the control of the flow controller; and a propeller that generates a thrust according to the rotational force of the main motor, and provides wind pressure corresponding to the spraying intensity of the water.

The main motor may include a brushless direct current motor (BLDC) motor.

The each of the at least one first haptic device may further include a servo motor for providing a wind pressure shape corresponding to the spraying shape by adjusting an angle of the corresponding main motor.

The servo motor may receive an angle adjustment signal according to the control of the stream shaper, and may adjust the angle of the corresponding main motor according to angle adjustment signal.

The wind pressure type of haptic firefighting nozzle interface may further include a tracking sensor that tracks location and direction for tracking in virtual space.

The wind pressure type of haptic firefighting nozzle interface may further include: a fire hose connected to the rear of the wind pressure type of haptic firefighting nozzle interface; and a second haptic device for providing haptic feedback of the same sensation as the repulsive force by the water pressure of an actual fire hose and the expansion pressure of the actual fire hose through the fire hose using compressed air.

The second haptic device may include: a compressed air nozzle that provides a path for injecting compressed air from an external compressed air pump into the fire hose; and a haptic controller that interworks with at least one first haptic device, and provides haptic feedback by expanding and contracting the fire hose through injection and withdrawal of the compressed air through the compressed air nozzle.

The second haptic device may further include a vibration actuator that generates vibration to feel the continuous spraying of water according to a control of the haptic controller when water is continuously sprayed on the VR content.

According to another embodiment, an operation method of a wind pressure type of haptic firefighting nozzle interface that is interworked with virtual reality (VR) content for virtual firefighting training is provided. The operation method includes: obtaining input values including an adjustment value of a flow controller for adjusting a spraying intensity of water sprayed on the VR content and an adjustment value of a stream shaper for adjusting a spray shape according to a radiation angle of water sprayed on the VR content; providing the input values to the VR content; and providing haptic feedback corresponding to the spraying intensity and spraying shape of water sprayed in response to the input values in the VR content using wind pressure.

The providing the haptic feedback using wind pressure may include providing a wind pressure corresponding to the spraying intensity of the water using at least one first haptic device, and each of the at least one first haptic device may include: a main motor that generates rotational force according to rotation; a transmission that rotates the main motor based on the adjustment value of the flow controller; and a propeller that generates a thrust according to the rotational force of the main motor, and provides the wind pressure corresponding to the spraying intensity of the water.

The providing the haptic feedback using wind pressure may further include providing a wind pressure shape corresponding to the spraying shape by adjusting an angle of each main motor of the at least one first haptic device.

The providing a wind pressure shape may include: providing wind pressure to a wider area of user's body as the radiation angle is greater; and providing wind pressure to be concentrated on one part of the user's body when the spray shape is a direct shape.

The obtaining input values may include receiving location and direction from a tracking sensor.

The providing the input values to the VR content may include estimating a location and direction for spraying water according to the location and direction in the VR content.

The operation method may further include providing haptic feedback of the same sensation as the repulsive force by the water pressure of a fire hose connected to the rear of the wind pressure type of haptic firefighting nozzle interface and the expansion pressure of an actual fire hose through expansion and contraction of the fire hose using compressed air.

The operation method may further include providing haptic feedback of a sense that water is continuously sprayed using vibration when water is continuously sprayed on the virtual reality content.

The adjustment value of the flow controller may include a rotation value of the rotary potentiometer equipped in the flow controller, and the adjustment value of the stream shaper may include distance value of the infrared distance sensor equipped in the stream shaper.

DETAILED DESCRIPTION OF THE EMBODIMENTS

Figure 1:
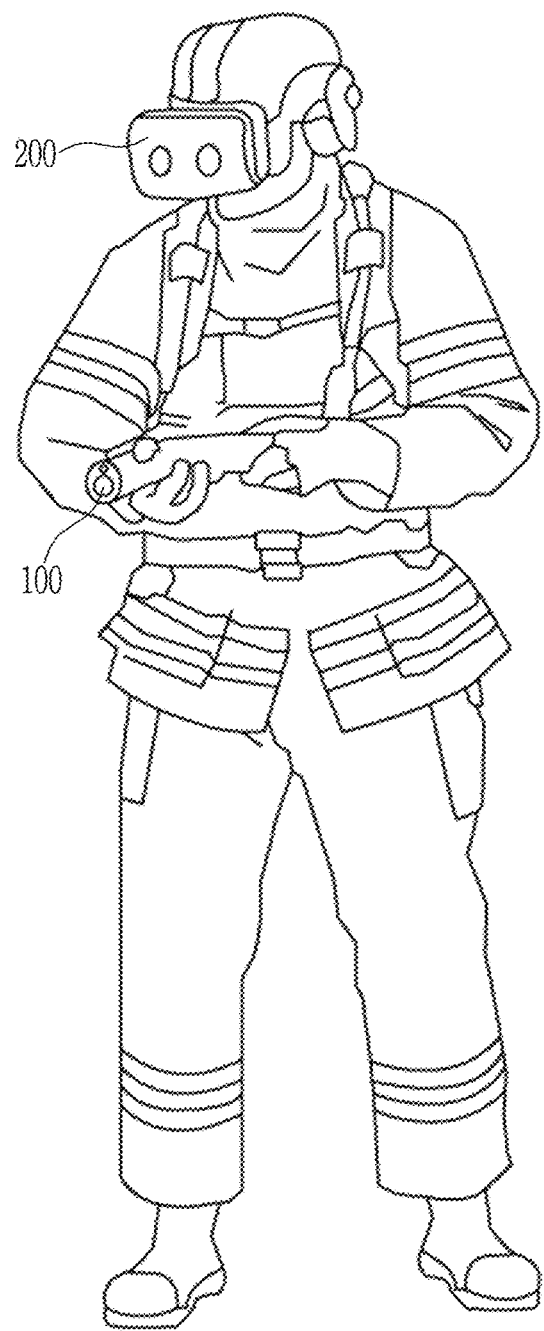
FIG. 1 is a diagram illustrating an example of performing a virtual firefighting training using a wind pressure type of haptic firefighting nozzle interface according to an embodiment.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Expressions described in the singular herein may be construed as singular or plural unless an explicit expression such as "one" or "single" is used.

As used herein, "and/or" includes each and every combination of one or more of the recited elements.

In this specification, terms including an ordinal number, such as first, second, etc., may be used to describe various elements, but the elements are not limited by the terms. The above terms are used only for the purpose of distinguishing one element from another element. For example, without departing from the scope of the present disclosure, a first element may be referred to as a second element, and similarly, a second element may be referred to as a first element.

In the flowchart described with reference to the drawings in this specification, the order of operations may be changed, several operations may be merged, some operations may be divided, and specific operations may not be performed.

Furthermore, in this specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, a wind pressure type of haptic firefighting nozzle interface for virtual firefighting training and an operation method thereof according to an embodiment of the present disclosure will be described in detail with reference to the drawings.

FIG. 1 is a diagram illustrating an example of performing a virtual firefighting training using a wind pressure type of haptic firefighting nozzle interface according to an embodiment.

Referring to FIG. 1, the wind pressure type of haptic firefighting nozzle interface 100 is manufactured based on a firefighting nozzle used in an actual field. Therefore, the wind pressure type of haptic firefighting nozzle interface 100 can realistically provide the feeling of use of the firefighting nozzle, and can increase immersion during virtual firefighting training and improve training efficiency.

The wind pressure type of haptic firefighting nozzle interface 100 can operate in connection with VR content for virtual firefighting training, and provides haptic feedback using wind pressure to a user who conducts virtual firefighting training.

For example, the user shown in FIG. 1 may use VR content showing a virtual fire situation through a head mount display (HMD) 200. At this time, when the user manipulates the wind pressure type of haptic firefighting nozzle interface 100, water may be sprayed to a virtual fire point in the VR content interworked thereto, and this situation may be displayed to the user through the HMD 200.

That is, when the user pulls a flow controller equipped on the wind pressure type of haptic firefighting nozzle interface 100, virtual water is also sprayed on the screen displayed through the HMD 200, so a virtual fire can be extinguished.

The wind pressure type of haptic firefighting nozzle interface 100 according to an embodiment may be implemented in the form shown in FIGS. 2 to 7.

Figure 2:
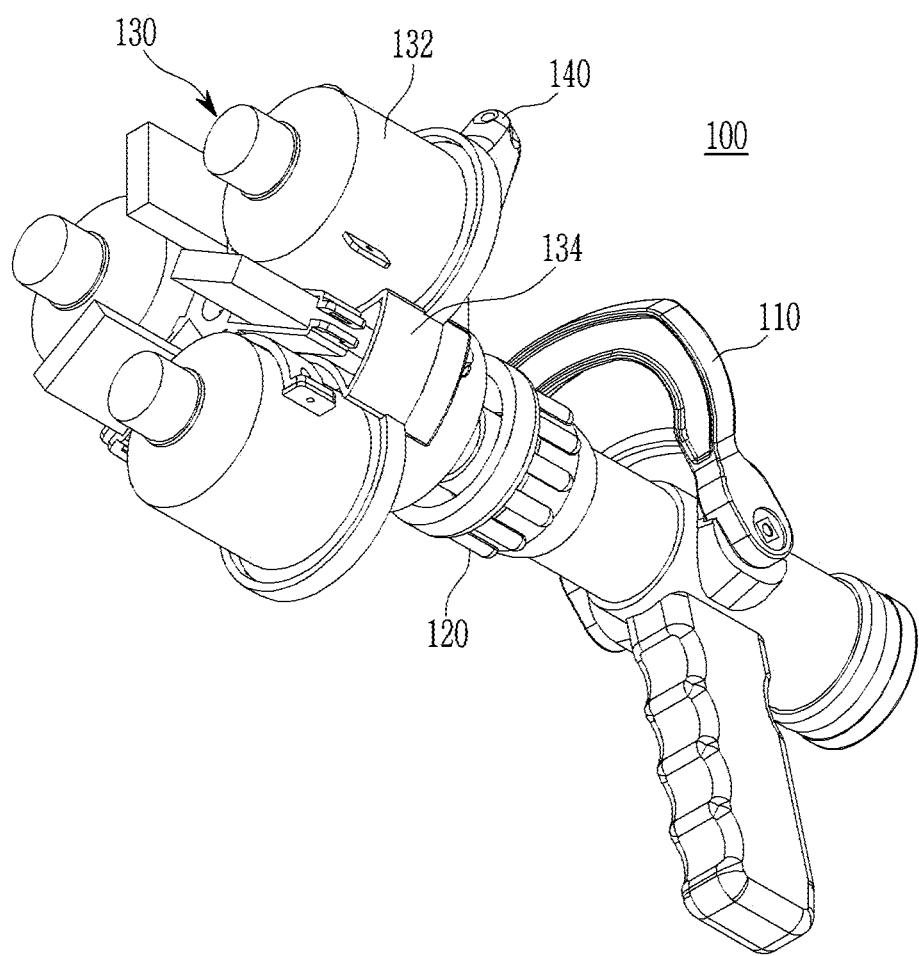
FIG. 2 is a perspective view of a wind pressure type of haptic firefighting nozzle interface according to an embodiment.
Figure 3:
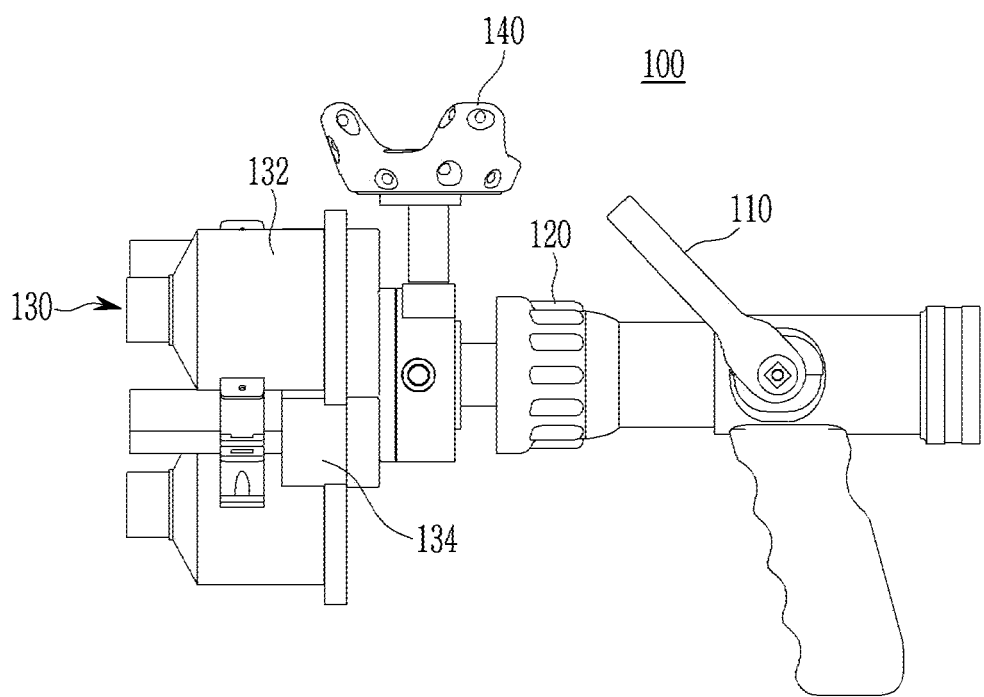
FIG. 3 is a side view of a wind pressure type of haptic firefighting nozzle interface according to an embodiment.
Figure 4:
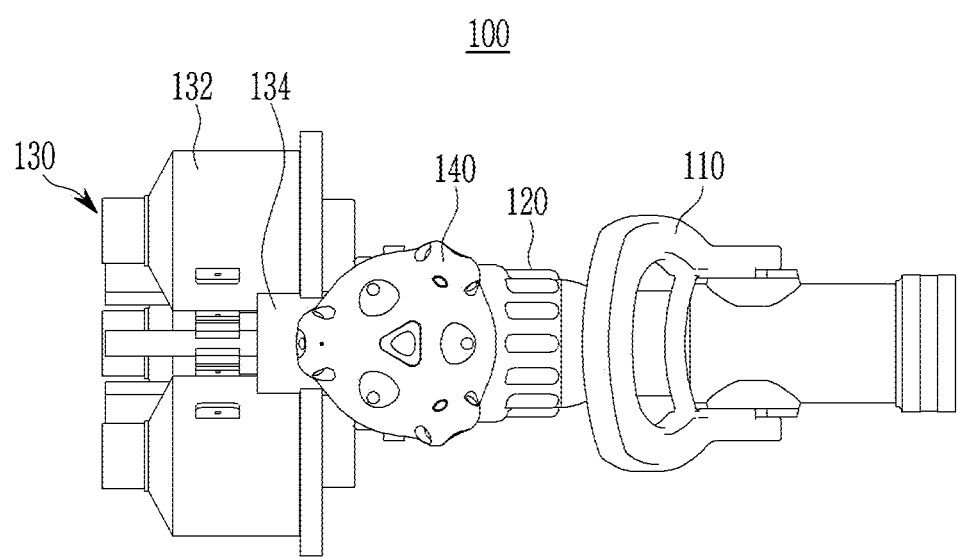
FIG. 4 is a plan view of a wind pressure type of haptic firefighting nozzle interface according to an embodiment.
Figure 5:
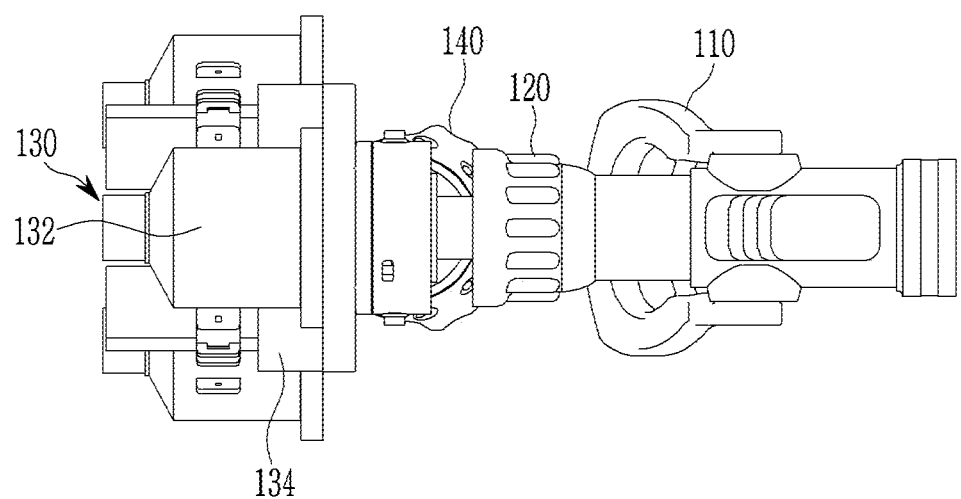
FIG. 5 is a bottom view of a wind pressure type of haptic firefighting nozzle interface according to an embodiment.
Figure 6:
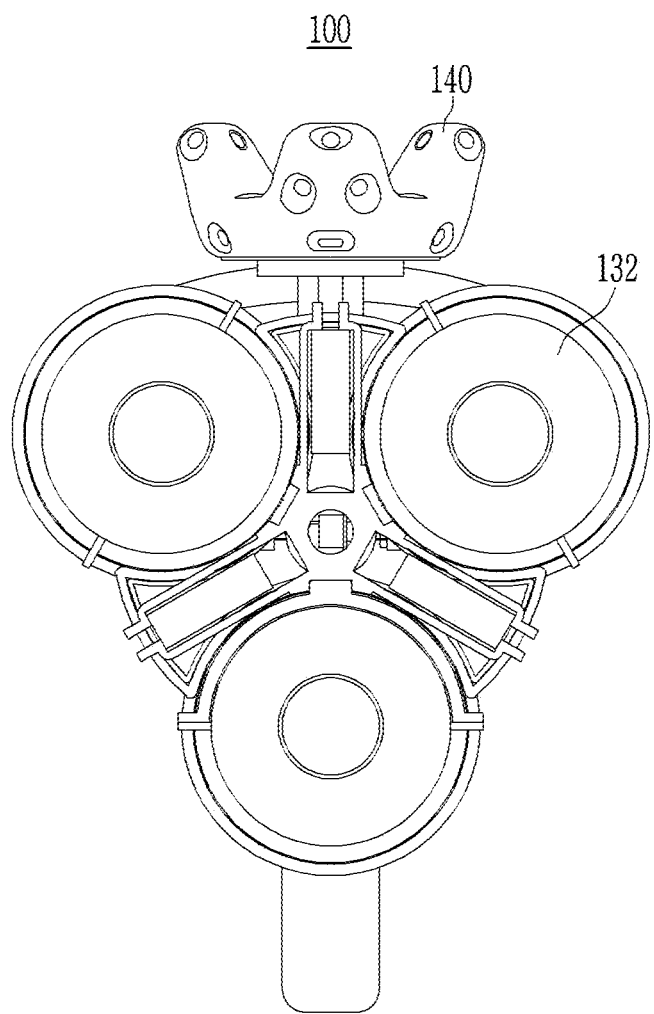
FIG. 6 is a front view a wind pressure type of haptic firefighting nozzle interface according to an embodiment.
Figure 7:
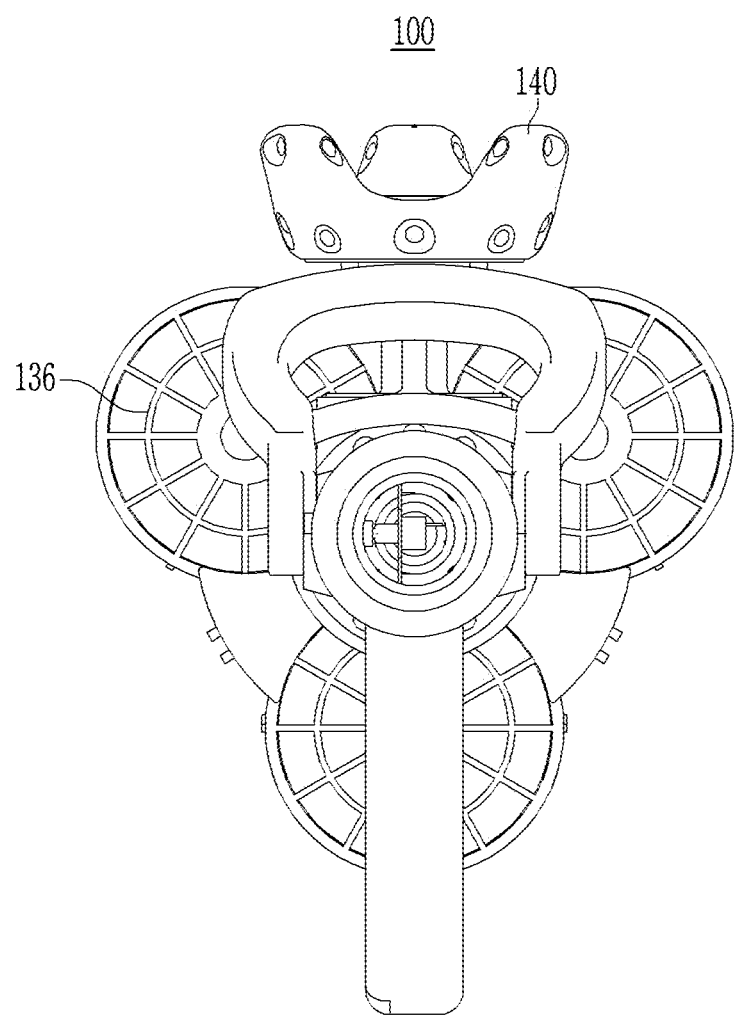
FIG. 7 is a rear view of a wind pressure type of haptic firefighting nozzle interface according to an embodiment.

FIGS. 2 to 7 are views showing an example of an external appearance of a wind pressure type of haptic firefighting nozzle interface according to an embodiment, respectively. FIG. 2 is a perspective view of a wind pressure type of haptic firefighting nozzle interface according to an embodiment, FIG. 3 is a side view of a wind pressure type of haptic firefighting nozzle interface according to an embodiment, FIG. 4 is a plan view of a wind pressure type of haptic firefighting nozzle interface according to an embodiment, and FIG. 5 is a bottom view of a wind pressure type of haptic firefighting nozzle interface according to an embodiment. Furthermore, FIG. 6 is a front view a wind pressure type of haptic firefighting nozzle interface according to an embodiment, and FIG. 7 is a rear view of a wind pressure type of -haptic firefighting nozzle interface according to an embodiment.

Referring to FIGS. 2 to 7, the wind pressure type of haptic firefighting nozzle interface 100 may include a flow controller 110, a stream shaper 120, and a haptic device 130. The wind pressure type of haptic firefighting nozzle interface 100 may further include a tracking sensor 140.

The wind pressure type of haptic firefighting nozzle interface 100 has a shape similar to that of an actual firefighting nozzle.

The flow controller 110 adjusts the waterproofing strength of water sprayed when extinguishing a fire virtually. In this case, in order to allow the haptic device 130 to receive the adjustment value of the flow controller 110, a rotary potentiometer may be used.

A rotary potentiometer is equipped on the flow controller 110, and the rotation value of the rotary potentiometer corresponds to the control value of the flow controller 110, and indicates the strength of water according to the adjustment of the flow controller 110.

The rotary potentiometer rotates as the user pulls the flow controller 110, and may be a sensor whose value changes according to the rotation. Accordingly, the rotation value of the rotary potentiometer may be generated corresponding to the angle at which the user pulls or adjusts the flow controller 110. In this case, it may be determined that the waterproofing strength of the water sprayed from the VR content is strong as the rotation value of the rotary potentiometer increases. That is, when a user of VR content pulls the flow controller 110 and the rotation value of the rotary potentiometer is the maximum, the waterproof strength of the water sprayed from the VR content may also be the maximum. On the other way, when the user of VR content gradually pushes the flow controller 110 and the rotation value of the rotary potentiometer gradually decreases, the strength of the water sprayed from the VR content may also gradually weaken.

The stream shaper 120 adjusts the spraying shape of water according to the radiation angle of water sprayed on the VR content. In order to receive the adjustment value of the flow controller 110 in the haptic device, an infrared distance sensor may be used.

The infrared distance sensor is equipped on the flow controller 110, and the distance value of the infrared distance sensor corresponds to the adjustment value of the stream shaper 120, and may indicate a spraying shape according to the adjustment of the stream shaper 120. As the distance value of the infrared distance sensor is smaller, it may be determined that the radiation angle of water sprayed from the VR content is smaller. That is, when the user of VR content moves the stream shaper 120 to the front of the wind pressure type of haptic firefighting nozzle interface 100 and the distance value of the infrared distance sensor is the minimum, the radiation angle of the water sprayed from the VR content is the minimum, and water can be sprayed narrowly. On the other way, when the user of VR content moves the stream shaper 120 to the rearmost part of the wind pressure type of haptic firefighting nozzle interface 100 and the distance value of the infrared distance sensor is the maximum, the radiation angle of the water sprayed from the VR content becomes the maximum, and water can be sprayed widely.

The stream shaper of the firefighting nozzle, which is generally used in actual fire sites, can change the water injection type by adjusting the radiation angle through rotation. In this embodiment, in order to use the feeling of use as it is, when the stream shaper 120 moves front or rear, the infrared distance sensor may detect the changed distance of the stream shaper 120, and generate a distance value.

The distance value generated in this way can be used as a value for controlling the radiation angle according to control of the stream shaper 120, that is, the type of water injection in VR content. That is, the water injection type according to the radiation angle may be changed by adjusting the space through which water is waterproofed while the stream shaper 120 moves front or rear.

A fire hose (150 in FIG. 11) may be connected to the rear of the wind pressure type of haptic firefighting nozzle interface 100 to expand the fire hose with a compressed air pump.

The wind pressure type of haptic firefighting nozzle interface 100 uses the haptic device 130 to generate haptic feedback, and provides the user with the same sense of waterproof pressure as when using an actual firefighting nozzle using the haptic feedback.

Manipulation of the wind pressure type of haptic firefighting nozzle interface 100 can be controlled using the flow controller 110 and the stream shaper 120 like an actual firefighting nozzle, and the haptic feedback may be adjusted according to the control through the flow controller 110 and the stream shaper 120.

According to an embodiment, wind pressure may be used as haptic feedback.

The haptic device 130 includes a main motor 132, a transmission 134, and a propeller 136. One main motor 132, one transmission 134, and one propeller 136 constitute one haptic device 130. According to an embodiment, the three haptic devices 130 operate as a set to generate sufficient thrust.

The main motor 132 generates rotational force according to the control of the transmission 134.

The transmission 134 rotates the main motor 132 according to the main motor rotation signal. The transmission 134 may receive a motor rotation signal according to the adjustment of the flow controller 110. The main motor rotation signal may include a rotation value of the rotary potentiometer.

The propeller 136 generates wind pressure in the direction of the body of the user by generating thrust according to the rotational force of the main motor 132.

In this case, the number and structure of the main motors 132 may vary depending on the type of motor and propeller used.

In an embodiment, since the waterproof pressure of a general firefighting nozzle in use in Korea has a power of about 7 kg/cm$^2$, a brushless direct current motor (BLDC) motor and a propeller may be used as the main motor 132 and the propeller 136 to satisfy this, and the haptic device 130 may be implemented through a motor and a propeller suitable for the change in the type of firefighting nozzle or strength.

In addition, the number of main motors 132, the direction and strength of each main motor 132, the number of wings of the propeller 136, and the direction of the propeller 136 can be adjusted according to the characteristics or contents of the actual equipment. In the firefighting nozzle used in the embodiment, it is shown that all motors 132 operate in the same direction and the strength is adjusted according to the flow controller 110.

The wind pressure type of haptic firefighting nozzle interface 100 provides a different wind pressure shape according to the control of the stream shaper 120.

The haptic device 130 may further include a servo motor (not shown in the drawing) in order to provide a different wind pressure shape according to the control of the stream shaper 120.

The servo motor may be positioned between the main motor 132 and the body of the firefighting nozzle. There is a structure to support the main motor 132 in front of the body of the firefighting nozzle, and the main motor 132 is mounted to this structure. The servo motor is positioned between this structure and the main motor 132, receives an angle adjustment signal according to the adjustment of the stream shaper 120, and adjusts the angle of the main motor 132 according to the angle adjustment signal. The angle adjustment signal may include a distance value of the infrared distance sensor. The angle may be basically adjusted to 0 to 45 degrees, and the main motor 132 may be adjusted to a wider angle according to the characteristics of the servo motor.

In the case of an actual firefighting nozzle, the spraying shape may be adjusted in a radial or direct shape through the stream shaper 120. Similarly, the haptic device 130 adjusts the angle of the main motor 132 according to the spraying shape controlled through the stream shaper 120, thereby providing a wind pressure shape corresponding to the spraying shape. In this case, in the VR content, a screen that sprays water to a virtual fire point according to a spraying shape may be displayed to the user.

The tracking sensor 140 provides three-dimensional location information, and is used for tracking in virtual space like a vive tracker. That is, the tracking sensor 140 tracks the location of the wind pressure type of haptic firefighting nozzle interface 100 in the virtual space. In reality, when the spray of water is manipulated with the location and direction (posture) of the firefighting nozzle by the user, virtual water is sprayed based on the tracked location and direction (posture) in the VR content space. In addition, the location and direction for spraying water in the VR content space may be estimated according to a value sensed by the tracking sensor 140.

The position of the tracking sensor 140 can be freely changed, and basically, it can be arranged at a position where there is no inconvenience when using the firefighting nozzle.

Figure 8:
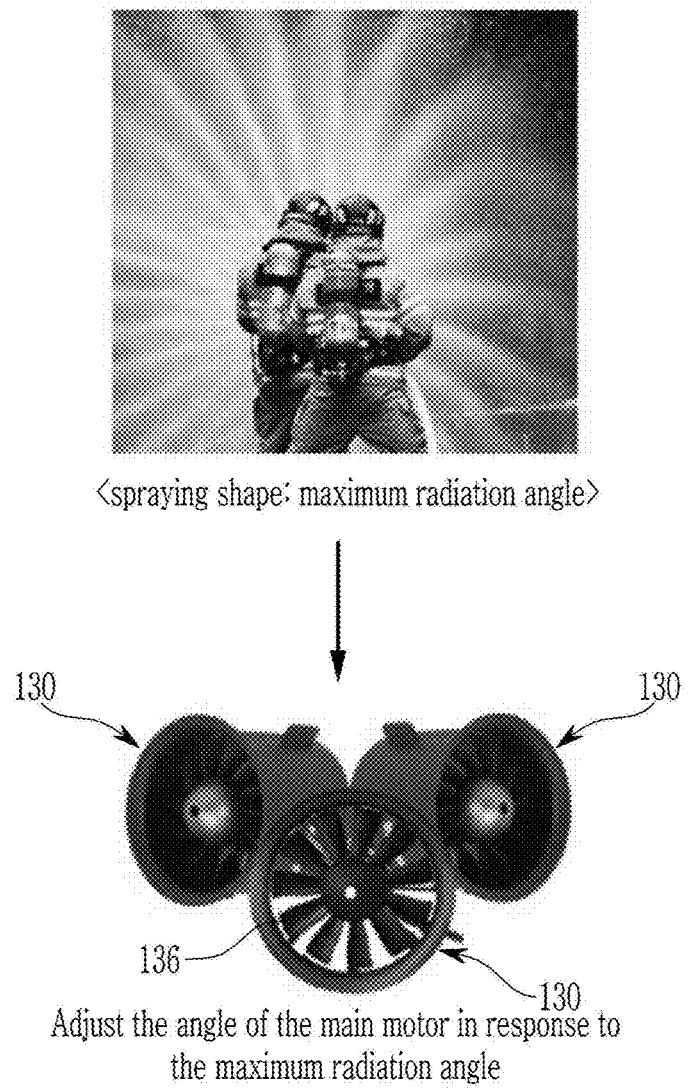
FIGS. 8 to 10 are diagrams each showing an example of the angle control of the main motor by the servo motor and the spraying shape output from VR contents according to an embodiment.
Figure 9:
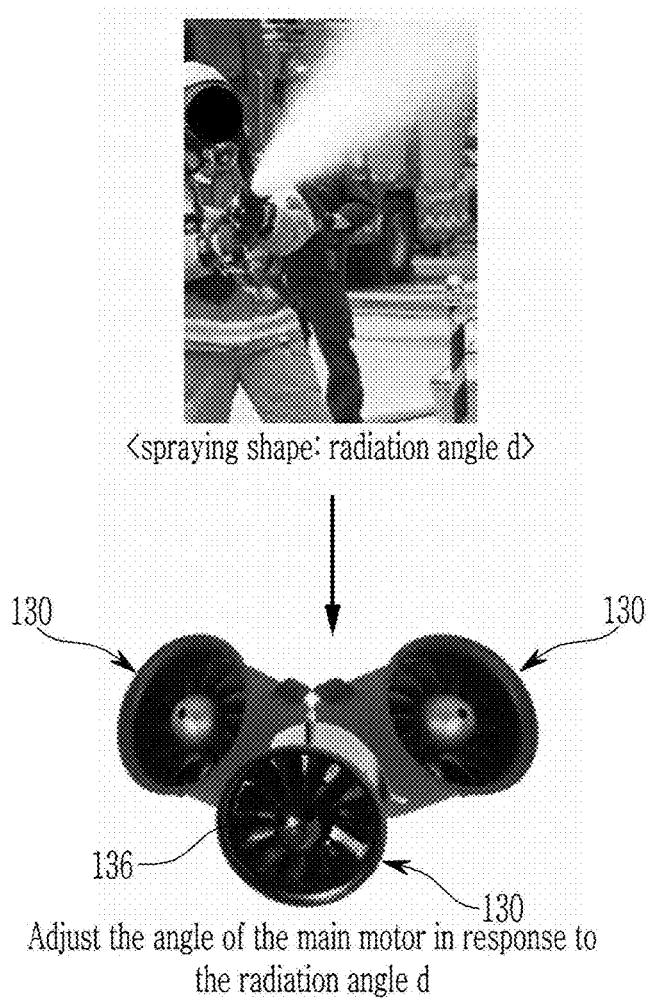
Figure 10:
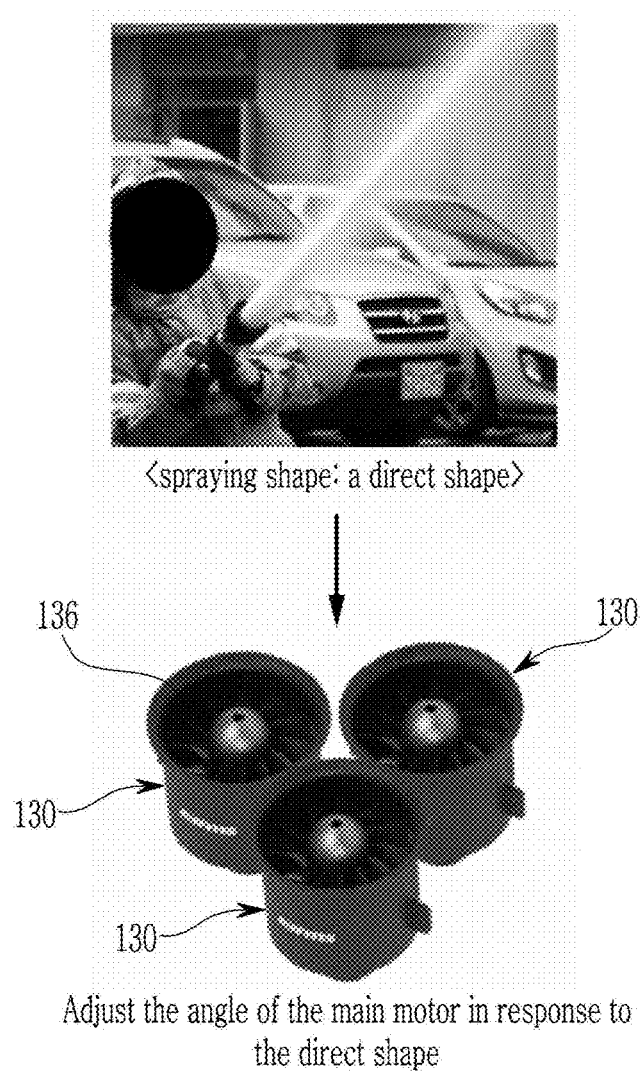

FIGS. 8 to 10 are diagrams each showing an example of the angle control of the main motor by the servo motor and the spraying shape output from VR contents according to an embodiment.

As shown in FIGS. 8 to 10, the actual firefighting nozzle suppresses the fire by spraying water in a radial shape or direct shape form through the stream shaper 120, and the maximum radiation angle may be 120 degrees to 150 degrees.

As shown in FIG. 8, when the spraying shape has the maximum radiation angle, the angle of the main motor 132 is adjusted so that the wind pressure shape also has the maximum radiation angle. Then, the wind pressure is then provided to a large area of the user's body.

On the other hand, as shown in FIG. 9, when the spraying shape has a radiation angle d that is smaller than the maximum radiation angle, the angle of the main motor 132 is adjusted so that the wind pressure shape also has a radiation angle corresponding to the radiation angle d of the spraying shape. Then, the wind pressure may be provided to a smaller area than that of FIG. 8 of the user's body.

Meanwhile, as shown in FIG. 10, when the spraying shape is a direct shape, the angle of the main motor 132 is adjusted so that the wind pressure form also has a direct shape. Then, the wind pressure is concentrated on one part of the user's body.

In this way, the wind pressure type of haptic firefighting nozzle interface 100 provides a wind pressure shape corresponding to the spraying shape by adjusting the angle of the main motor 132 through the servo motor.

Figure 11:
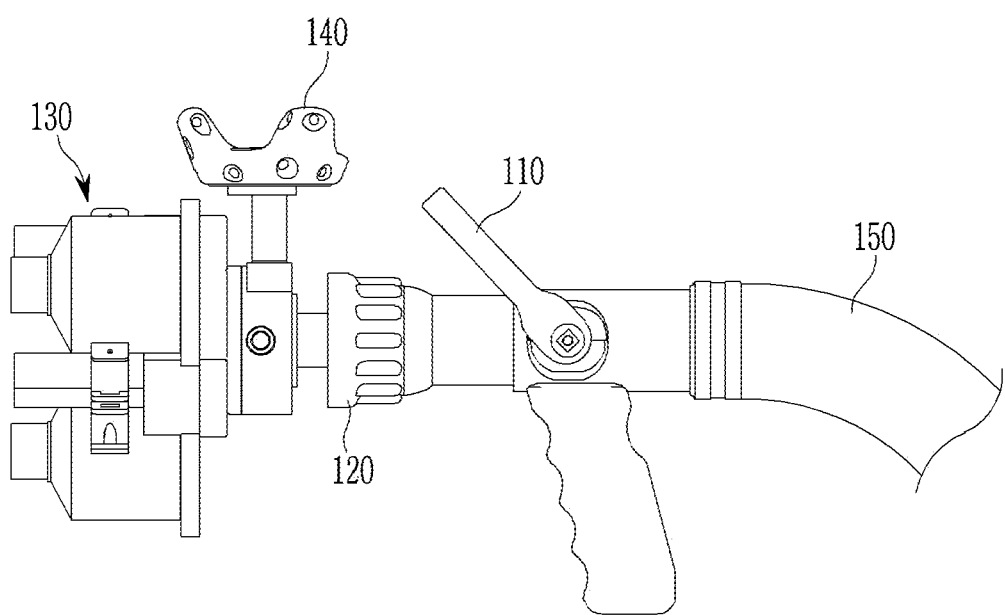
FIG. 11 is a diagram illustrating a fire hose connected to a wind pressure type of haptic firefighting nozzle interface according to an embodiment.

FIG. 11 is a diagram illustrating a fire hose connected to a wind pressure type of haptic firefighting nozzle interface according to an embodiment.

Referring to FIG. 11, a fire hose 150 having the same shape as an actual fire hose may be connected to the rear of the wind pressure type of haptic firefighting nozzle interface 100.

The wind pressure type of haptic firefighting nozzle interface 100 transmits the compressed air delivered from the compressed air pump to the fire hose 150 through this structure, so that it is possible to provide haptic feedback of the same sensation as the repulsive force by the water pressure of the actual firefighting nozzle and/or the expansion pressure of the fire hose.

In the case of an actual firefighting nozzle, the fire hose is expanded due to the movement of water when a fire is extinguished because water supplied through a fire hose connected to a fire engine or fire hydrant is sprayed. According to an embodiment, the wind pressure type of haptic firefighting nozzle interface 100 injects compressed air through a fire hose 150 in order to provide the same feeling of use as haptic feedback even when performing virtual firefighting training.

Figure 12:
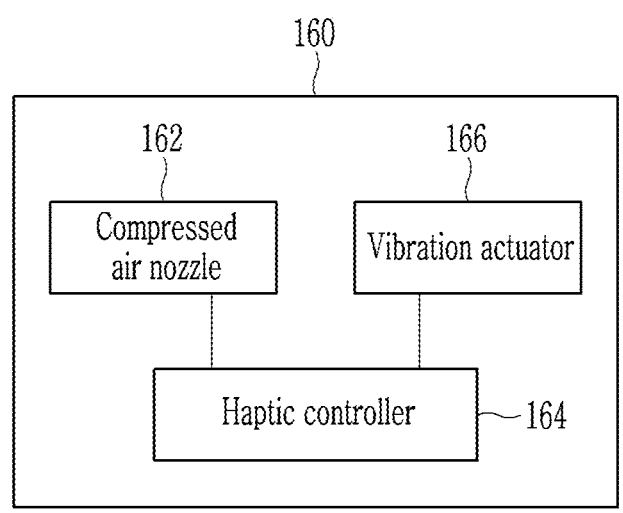
FIG. 12 is a diagram illustrating an example of a haptic device for providing compressed air as haptic feedback.
Figure 13:
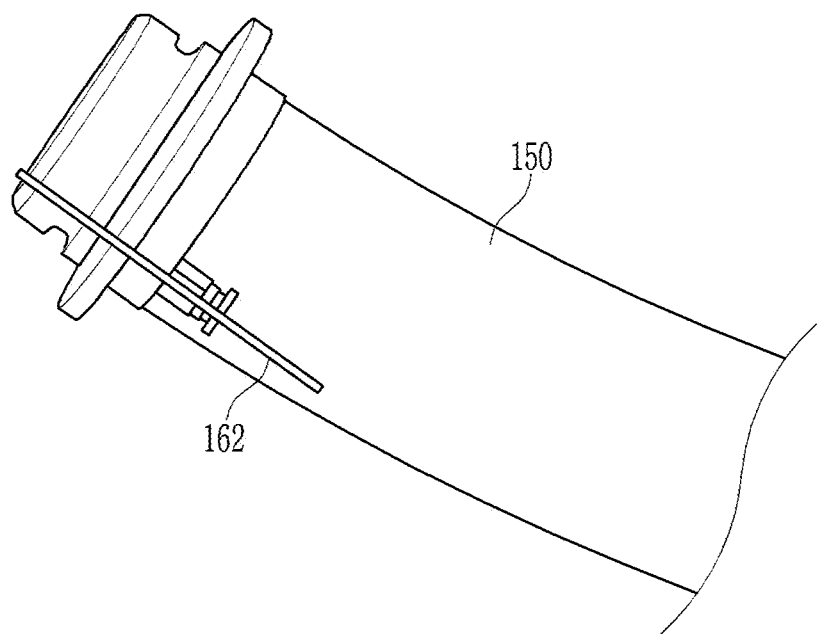
FIG. 13 is a diagram showing an example of the compressed air nozzle shown in FIG. 12.

FIG. 12 is a diagram illustrating an example of a haptic device for providing compressed air as haptic feedback, and FIG. 13 is a diagram showing an example of the compressed air nozzle shown in FIG. 12.

Referring to FIG. 12, the haptic device 160 may include a compressed air nozzle 162, a haptic controller 164, and a vibration actuator 166 to provide compressed air as haptic feedback.

As shown in FIG. 13, the compressed air nozzle 162 is a path through which compressed air from an external compressed air pump can be injected into the fire hose 150. The compressed air is injected into the fire hose 150 through the compressed air nozzle 162, and then the fire hose 150 is expanded.

The haptic controller 164 injects compressed air into the fire hose 150 during virtual firefighting training through VR content, thereby expanding the fire hose 150 as if it were actually waterproof. The haptic controller 164 may contract the fire hose 150 by removing compressed air from the fire hose 150 so that the fire hose 150 may maintain a contracted state when water is not sprayed in the VR content.

In addition, the haptic controller 164 may control the operation of the vibration actuator 166 during virtual firefighting training through VR content. When water is continuously sprayed on the VR content, the haptic controller 164 controls the vibration actuator 166 to feel the continuous spraying of water.

The haptic controller 164 may provide haptic feedback using compressed air and vibration in connection with the haptic device 130.

The haptic controller 164 may control the injection of compressed air into the fire hose 150 and control the vibration actuator 166 based on the adjustment value of the flow controller 110 and/or the adjustment value of the stream shaper 120.

The vibration actuator 166 may generate vibration according to the control of the haptic controller 164.

The vibration actuator 166 may be positioned on the handle portion of the wind pressure type of haptic firefighting nozzle interface 100, and the haptic controller 164 may be positioned at a portion to which the fire hose 150 is connected.

The positions of the vibration actuator 166 and the haptic controller 164 may be changed.

Figure 14:
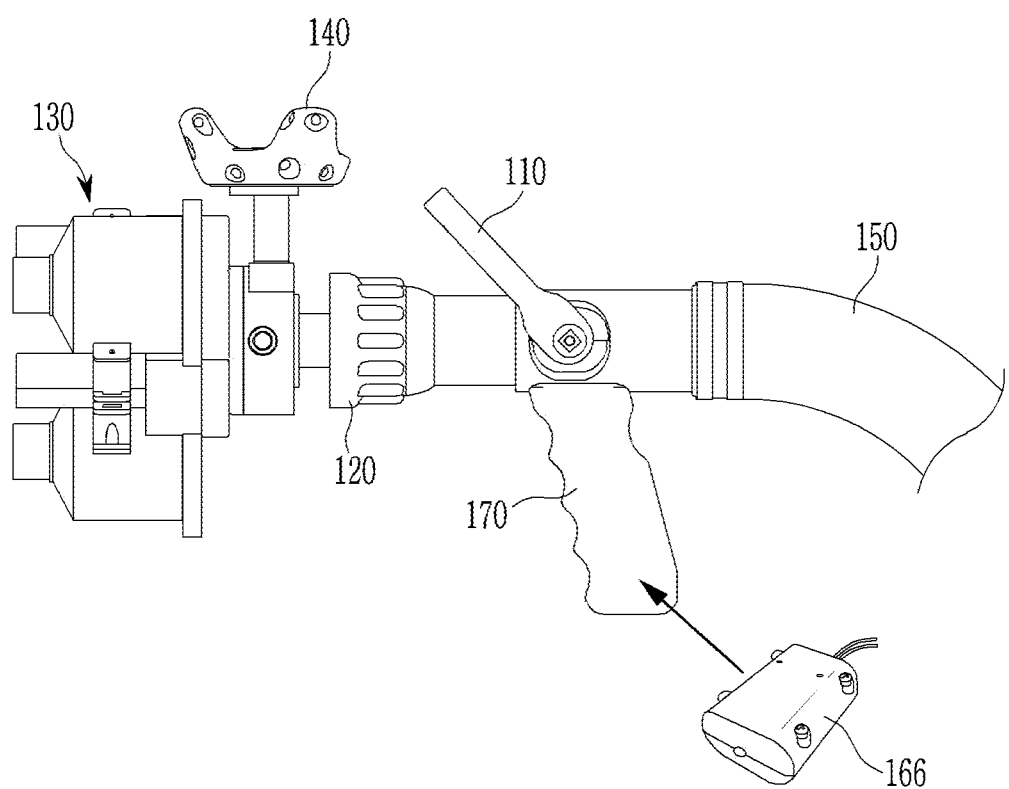
FIG. 14 is a diagram showing the vibration actuator shown in FIG. 12.

FIG. 14 is a diagram showing the vibration actuator shown in FIG. 12.

Referring to FIG. 14, the vibration actuator 166 is embedded into the handle portion 170 of the wind pressure type of haptic firefighting nozzle interface 100 to provide a feeling that water is continuously sprayed through the firefighting nozzle, and may operate into the handle portion 170.

By embedding the vibration actuator 166 into the handle portion 170 of the wind pressure type of haptic firefighting nozzle interface 100, it is possible to continuously provide the sensation that occurs when water moves inside the fire hose 150, and it is possible to provide additional haptic feedback separate from the expansion.

For example, the vibration actuator 166 may generate haptic feedback based on a sound when water moves in an actual firefighting nozzle, and may provide a vibration with the same feeling as if water actually moves. At this time, when the wind pressure sprayed by the adjustment of the flow controller 110 is increased, the vibration of the vibration actuator 166 is also increased, and when the wind pressure sprayed by the adjustment of the flow controller 110 is decreased, the vibration of the vibration actuator 166 can also be weakened.

That is, the haptic controller 164 may adjust the intensity of the haptic feedback in consideration of the water strength and the radiation angle.

For example, when the waterproof strength is increased, it is possible to provide haptic feedback by increasing the wind pressure and the amount of compressed air injected and increasing the intensity of the vibration.

As another example, even when the radiation angle is decreased in a state where there is no change in the waterproof strength, it is possible to provide haptic feedback by increasing the wind pressure and the amount of compressed air injected and increasing the intensity of the vibration.

As another example, the intensity and type of vibration may be adjusted to provide a sense suitable for each water injection type according to the water injection type by the radiation angle.

In this way, the haptic controller 164 and the vibration actuator 166 of the haptic device 160 may operate in connection with the haptic device 130, and the sense according to the spraying intensity and spraying shape expressed by wind pressure may be supplemented by compressed air and vibration.

As described above, according to one embodiment, by providing compressed air injection and vibration generation along with wind pressure as haptic feedback, the user can more realistically experience the sensation of spraying water when extinguishing a fire.

Figure 15:
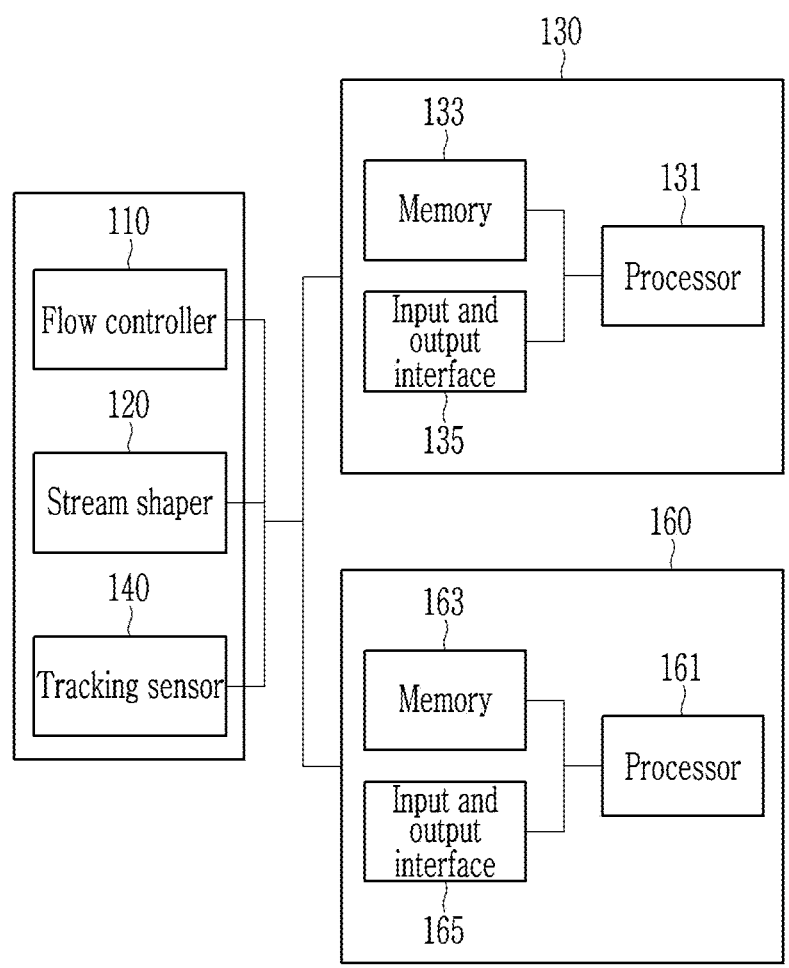
FIG. 15 is a block diagram illustrating a wind pressure type of haptic firefighting nozzle interface according to another embodiment.

FIG. 15 is a block diagram illustrating a wind pressure type of haptic firefighting nozzle interface according to another embodiment.

Referring to FIG. 15, the haptic devices 130 and 160 include processors 131 and 161, memories 133 and 163, and input and output interfaces 135 and 165, respectively.

Each of the components of each of the haptic devices 130 and 160 may be connected by a common bus to communicate with each other. In addition, each of the components may be connected through an individual interface or a separate bus centering on the processor 131 and 161 instead of the common bus.

The processors 131 and 161 may be implemented as various types such as an application processor (AP), a central processing unit (CPU), a graphics processing unit (GPU), etc., and may be any semiconductor device that executes a command stored in the memory 120 or the storage device 133 and 163. The processors 131 and 161 may execute program commands stored in the memories 133 and 163.

When the processor 131 obtains input values for controlling the VR content, it provides the input value to the VR content through the input and output interface 135. The VR content may provide a screen for each fire situation for virtual firefighting training based on the input values.

For example, when the rotation value of the rotary potentiometer by manipulation of the flow controller 110 is transmitted as an input value, water may be sprayed on the VR content in the location and direction input by the tracking sensor 140, and the radiation shape of the sprayed water may be changed according to the distance value of the infrared distance sensor by the adjustment of the stream shaper 120. That is, when the radiation angle is large according to the distance value, water may be displayed to be widely sprayed on the VR content, and when the radiation angle is small, water may be displayed to be sprayed narrowly on the VR content, in the virtual environment.

The processor 131 provides haptic feedback corresponding to the spraying intensity and spraying shape of water sprayed in response to input values in VR content using wind pressure.

In addition, the processor 161 may provide haptic feedback using compressed air and vibration by controlling the compressed air nozzle 162 and the vibration actuator 166 in response to the spraying intensity and spraying shape of water sprayed according to an input values in the VR content.

In addition, the processors 131 and 161 may control the output of the haptic feedback by interworking with the VR content.

The memories 133 and 163 may store input values generated from the flow controller 110, the stream shaper 120, and the tracking sensor 140, and store various information generated while providing a virtual firefighting training experience through VR content.

Also, the memories 133 and 163 may include various types of volatile or non-volatile storage media. The memories 133 and 163 may be located inside or outside the processors 131 and 161, and the memories 133 and 163 may be connected to the processors 131 and 161 through various known means.

The input and output interfaces 135 and 165 may be configured to transmit input values generated from the flow controller 110, the stream shaper 120, and the tracking sensor 140 to the processors 131 and 161, and may be configured to transmit the input values to the VR content, and may be configured to output haptic feedback from the processors 131 and 161.

All operations of the wind pressure type of haptic firefighting nozzle interface 100 according to an embodiment of the present disclosure may be controlled through an external embedded board (not shown in the drawing), and may be linked with VR content based on this. That is, input values generated from the flow controller 110, the stream shaper 120, and the tracking sensor 140 may be transmitted to the embedded board through the input and output interfaces 135 and 165.

For example, the wind pressure type of haptic firefighting nozzle interface 100 may be connected to the embedded board located outside through a connection part on the rear side to which a fire hose is connected. In this case, the embedded board may transmit and receive data through serial communication with the PC, and may provide haptic feedback while controlling the VR content according to the manipulation of the wind pressure type of the haptic firefighting nozzle interface 100.

That is, when a user who experiences virtual firefighting training based on VR content manipulates the flow controller 110, water may be sprayed on the VR content. In this case, the haptic feedback may be provided by the haptic devices 130 and 160 according to input values of the flow controller 110 and the stream shaper 120 manipulated by the user. Values corresponding to all operations may be transmitted and linked as VR content.

Through the wind pressure type of haptic firefighting nozzle interface 100, it is possible to provide the same feeling of use as in reality through wind pressure instead of water pressure.

Figure 16:
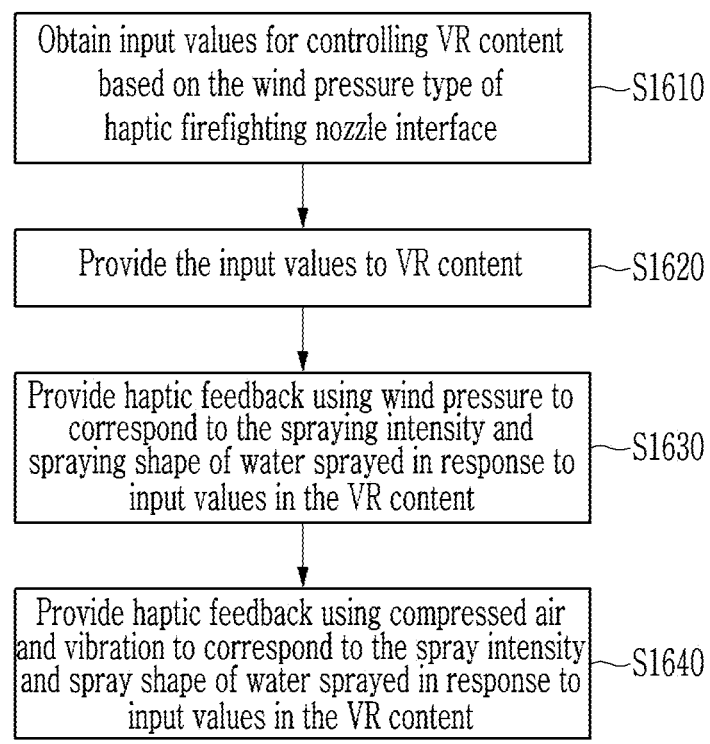
FIG. 16 is a flowchart illustrating an operation method of a wind pressure type of haptic firefighting nozzle interface according to an embodiment.

FIG. 16 is a flowchart illustrating an operation method of a wind pressure type of haptic firefighting nozzle interface according to an embodiment.

Referring to FIG. 16, the processors 131 and 161 obtain input values for controlling VR content based on the wind pressure type of haptic firefighting nozzle interface 100 for virtual firefighting training (S1610). At this time, the input values may be obtain from a flow controller 110 that adjusts intensity of water sprayed on the VR content based on the rotary potentiometer, a stream shaper 120 that adjusts the radiation angle of the water sprayed on the VR content based on an infrared distance sensor, and the tracking sensor 140 that tracks the location and direction.

The processor 131 provides the obtained input values as VR content (S1620). The VR content may provide a screen for each fire situation for virtual firefighting training based on the input values.

For example, when the rotation value of the rotary potentiometer by manipulation of the flow controller 110 is transmitted as an input value, water may be sprayed on the VR content in the location and direction input by the tracking sensor 140. Furthermore, according to the distance value of the infrared distance sensor by the adjustment of the stream shaper 120, when the radiation angle is large, water can be displayed to be sprayed widely in the virtual environment, and when the radiation angle is small, water can be displayed to spray narrowly in the virtual environment.

The processor 131 provides haptic feedback using wind pressure to correspond to the spraying intensity and spraying shape of water sprayed in response to input values in the VR content (S1630).

In addition, the processor 161 may provide haptic feedback using compressed air and vibration to correspond to the spray intensity and spray shape of water sprayed in response to input values in the VR content (S1640). That is, the processor 161 may provide the haptic feedback using compressed air and vibration in response to the haptic feedback using wind pressure. Haptic feedback using compressed air may be provided through a fire hose, and haptic feedback using vibration may be provided through a handle portion 170 of the wind pressure type of haptic firefighting nozzle interface 100.

At least some of the operation method of the wind pressure type of haptic firefighting nozzle interface according to the embodiment of the present disclosure may be implemented as a program or software executed in a computing device, and the program or software may be stored in a computer-readable medium.

Also, at least some of the operation method of the wind pressure type of haptic firefighting nozzle interface according to the embodiment of the present disclosure may be implemented as hardware capable of being electrically connected to the computing device.

According to the embodiment, by manufacturing a haptic firefighting nozzle interface for virtual firefighting training based on the actual firefighting nozzle, and expressing the waterproof pressure through wind pressure, it can provide the same usability and sensibility as the actual firefighting nozzle during firefighting training, and can provide a more realistic sense than the existing interface that simply provided a similar feeling of operation or feedback through vibration. It is also possible to practice watering techniques and postures to use the firefighting nozzle.

In particular, since wind pressure is used to express waterproof pressure, it is easier to maintain and manage than when using real water, and a user can practice firefighting training regardless of location. Furthermore, it is possible to increase training efficiency by increasing immersion and realism during virtual firefighting training of the user.

In addition to virtual firefighting training, it can be widely used as an interface tool for content that simulates specific spraying.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of programming language, including compiled or interpreted languages, and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read-only memory (CD-ROM), a digital video disk (DVD), etc., and magneto-optical media such as a floptical disk and a read-only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (OS) and one or more software applications that run on the OS. The processor device may also access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. A wind pressure type of haptic firefighting nozzle interface that is interworked with virtual reality (VR) content for virtual firefighting training, the wind pressure type of haptic firefighting nozzle interface comprising:
    a flow controller for adjusting spraying intensity of water sprayed on the VR content;
    a stream shaper for adjusting a spray shape according to a radiation angle of the water sprayed on the VR content; and
    at least one first haptic device for providing haptic feedback corresponding to the spraying intensity and the spraying shape determined according to control through the flow controller and the stream shaper using wind pressure,
    wherein the stream shaper comprises an infrared distance sensor configured to detect a forward or backward displacement of the stream shaper and to generate a distance value corresponding to the displacement, the distance value being used for adjusting the spray shape according to the radiation angle of the water sprayed on the VR content.

2. The wind pressure type of haptic firefighting nozzle interface of claim 1, wherein each of the at least one first haptic device includes:
    a main motor that generates rotational force according to rotation;
    a transmission that rotates the main motor by receiving a motor rotation signal according to the control of the flow controller; and
    a propeller that generates thrust according to the rotational force of the main motor, and provides wind pressure corresponding to the spraying intensity of the water.

3. The wind pressure type of haptic firefighting nozzle interface of claim 2, wherein the main motor includes a brushless direct current motor (BLDC) motor.

4. The wind pressure type of haptic firefighting nozzle interface of claim 2, wherein each of the at least one first haptic device further includes a servo motor for providing a wind pressure shape corresponding to the spraying shape by adjusting an angle of the corresponding main motor.

5. The wind pressure type of haptic firefighting nozzle interface of claim 4, wherein the servo motor receives an angle adjustment signal according to the control of the stream shaper, and adjusts the angle of the corresponding main motor according to an angle adjustment signal.

6. The wind pressure type of haptic firefighting nozzle interface of claim 1, further comprising a tracking sensor that track location and direction for tracking in virtual space.

7. The wind pressure type of haptic firefighting nozzle interface of claim 1, further comprising:
a fire hose connected to the rear of the wind pressure type of haptic firefighting nozzle interface; and
a second haptic device for providing haptic feedback of the same sensation as the repulsive force by the water pressure of an actual fire hose and the expansion pressure of the actual fire hose through the fire hose using compressed air.

8. The wind pressure type of haptic firefighting nozzle interface of claim 7, wherein the second haptic device includes:
a compressed air nozzle that provides a path for injecting compressed air from an external compressed air pump into the fire hose; and
a haptic controller that interworks with at least one first haptic device, and provides haptic feedback by expanding and contracting the fire hose through injection and withdrawal of the compressed air through the compressed air nozzle.

9. The wind pressure type of haptic firefighting nozzle interface of claim 8, wherein the second haptic device further includes a vibration actuator that generates vibration to feel the continuous spraying of water according to a control of the haptic controller when water is continuously sprayed on the VR content.

10. An operation method of a wind pressure type of haptic firefighting nozzle interface that is interworked with virtual reality (VR) content for virtual firefighting training, the operation method comprising:
obtaining input values including an adjustment value of a flow controller for adjusting a spraying intensity of water sprayed on the VR content and a distance value measured by an infrared distance sensor that detects a forward or backward displacement of a stream shaper, the distance value corresponding to the displacement and being used for adjusting a spray shape according to a radiation angle of water sprayed on the VR content;
providing the input values to the VR content; and
providing haptic feedback corresponding to the spraying intensity and spraying shape of water sprayed in response to the input values in the VR content using wind pressure.

11. The operation method of claim 10, wherein:
the providing of the haptic feedback using wind pressure includes providing a wind pressure corresponding to the spraying intensity of the water using at least one first haptic device, and
each of the at least one first haptic device includes:
a main motor that generates rotational force according to rotation;
a transmission that rotates the main motor based on the adjustment value of the flow controller; and
a propeller that generates thrust according to the rotational force of the main motor, and provides the wind pressure corresponding to the spraying intensity of the water.

12. The operation method of claim 11, wherein the providing the haptic feedback using wind pressure further includes providing a wind pressure shape corresponding to the spraying shape by adjusting an angle of each main motor of the at least one first haptic device.

13. The operation method of claim 12, wherein the providing a wind pressure shape includes:
providing wind pressure to a wider area of user's body as the radiation angle is greater; and
providing wind pressure to be concentrated on one part of the user's body when the spray shape is a direct shape.

14. The operation method of claim 10, wherein the obtaining input values includes receiving location and direction from a tracking sensor.

15. The operation method of claim 14, wherein the providing the input values to the VR content includes estimating a location and direction for spraying water according to the location and direction in the VR content.

16. The operation method of claim 10, further comprising providing haptic feedback of the same sensation as the repulsive force by the water pressure of a fire hose connected to the rear of the wind pressure type of haptic firefighting nozzle interface and the expansion pressure of an actual fire hose through expansion and contraction of the fire hose using compressed air.

17. The operation method of claim 10, further comprising providing haptic feedback of a sense that water is continuously sprayed using vibration when water is continuously sprayed on the virtual reality content.

18. The operation method of claim 10, wherein the adjustment value of the flow controller includes a rotation value of a rotary potentiometer equipped in the flow controller.

* * * * *